Figure 1:
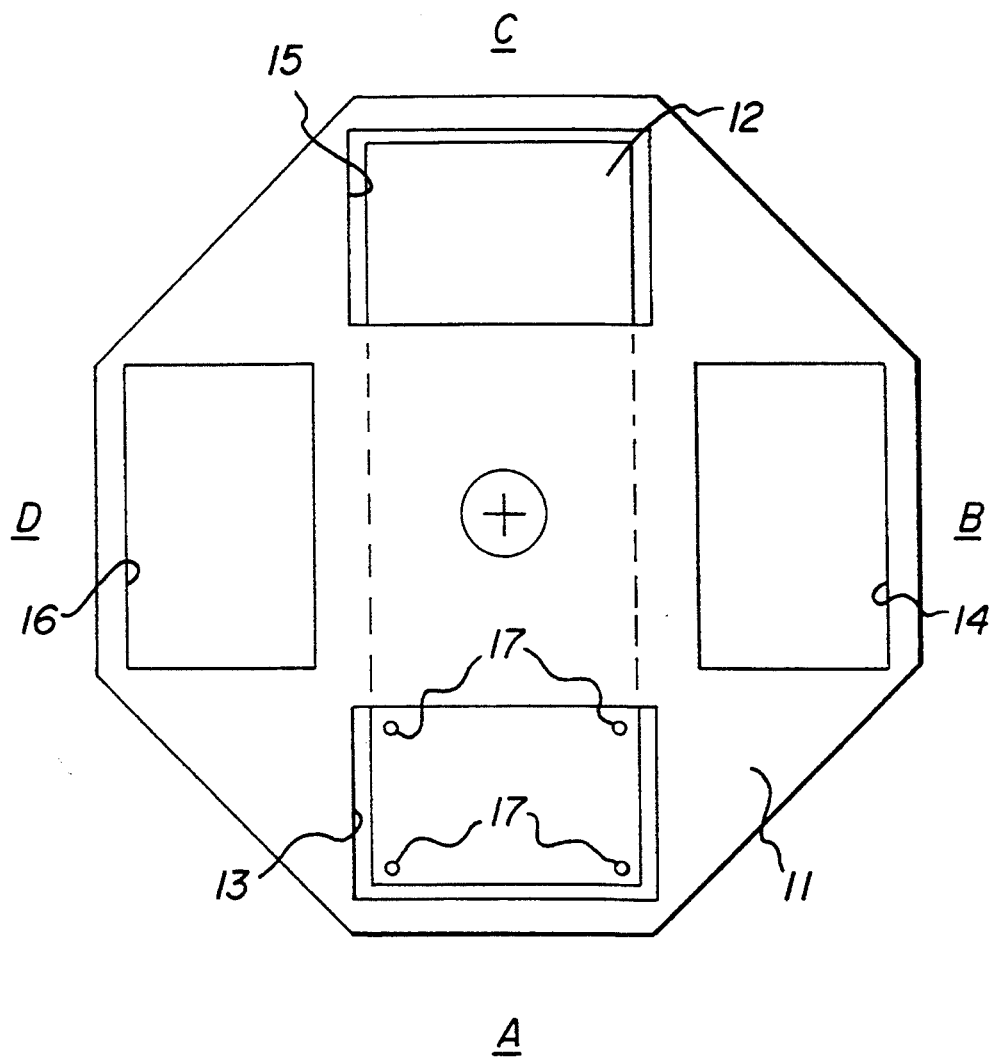

United States Patent [19]
Gilbert

[11] Patent Number: 5,337,938
[45] Date of Patent: Aug. 16, 1994

[54] WORKPIECE HANDLING SYSTEM

[75] Inventor: Graham P. Gilbert, Plymouth, Great Britain

[73] Assignee: Autotech Robotics Limited, Plymouth, Great Britain

[21] Appl. No.: 928,738

[22] Filed: Aug. 13, 1992

[30] Foreign Application Priority Data

Aug. 17, 1991 [GB] United Kingdom ............ 9117804.6

[51] Int. Cl.⁵ .................................................. B23K 37/04
[52] U.S. Cl. ........................................ 228/102; 29/785; 29/36; 228/8
[58] Field of Search ............... 228/8, 102, 47; 29/785, 29/792, 36

[56] References Cited

U.S. PATENT DOCUMENTS 5,117,544  6/1992  Kousaku et al. .................. 29/36 X

FOREIGN PATENT DOCUMENTS

| 100307 | 7/1983 | European Pat. Off. . |
|---|---|---|
| 208891 | 1/1987 | European Pat. Off. . |
| 1265539 | 4/1968 | Fed. Rep. of Germany . |
| 3333243 | 3/1985 | Fed. Rep. of Germany . |
| 2287307 | 10/1974 | France . |
| 763024 | 6/1954 | United Kingdom . |
| 1317662 | 7/1970 | United Kingdom . |
| 1387756 | 6/1972 | United Kingdom . |

*Primary Examiner*—Kenneth J. Ramsey
*Attorney, Agent, or Firm*—Larson and Taylor

[57] ABSTRACT

A workpiece handling system especially for carrying out computer-controlled welding operations has a workpiece table which is rotatable between indexed stations in one direction and a coaxially-mounted support for work-performing apparatus which is rotatable in both directions, either with or contra to the workpiece table. While workpieces are being loaded and unloaded at one station, work can be performed at or during indexed movement between other stations, the work-performing apparatus then rotating contra to the workpiece table to find the next workpiece to be worked on.

9 Claims, 1 Drawing Sheet

WORKPIECE HANDLING SYSTEM

This invention relates to workpiece handling systems for supporting workpieces and presenting them to work-performing apparatus. A typical use for workpiece handling systems of the type described is for performing a welding operation on a workpiece.

In the manufacture of many metallic products, automated welding is in common use, the welding apparatus often being a computer-controlled robotic system. With the aim of exploiting the inherent flexibility of such systems and improving productivity, workpiece handling systems have been developed which enable diverse workpieces to be presented to the welding apparatus according to changing production or customer requirements, the welding apparatus being programmed to identify each workpiece in turn and perform the appropriate welding operation thereon. Typically, such workpiece handling systems are arranged on a linear basis whereby workpieces are manually loaded on a work-presentation pallet at one end of the line while the welding operation is being concurrently performed by the robot on a previously-loaded workpiece and a completed workpiece is manually removed at the other end of the line. However, such systems are vulnerable to inequalities between loading, unloading and welding times with the result that optimum productivity and utilization of operators' time is not always or consistently achieved.

It is an object of the present invention to provide an improved workpiece handling system which enables more efficient production to be attained.

According to one aspect of the present invention, a workpiece handling apparatus comprises a workpiece table which is rotatable between indexed stations in one rotational direction and a coaxially-mounted support for work-performing apparatus which is rotatable in both rotational directions. The workpiece table and support are therefore rotatable in opposite directions and are rotatable in the same direction in one manner only.

The work-performing apparatus may be a computer-controlled robotic welding apparatus and for convenience it will be assumed throughout the remainder of this specification that the work-performing apparatus comprises such welding or similar workpiece-joining apparatus, without any specific limitation thereto being implied.

Preferably, the workpiece table includes a plurality n, where n is typically four, workpiece positions arranged equi-angularly about the rotation axis and the table is indexed for rotation in $(360/n)°$ increments or in multiples thereof, and the support is likewise indexed for movement, both in the allowed combinations of directions.

For convenience, it will be assumed in the following that the workpiece table is rotatable in a counter-clockwise direction, that the apparatus support is rotatable in a clockwise direction, and that they are simultaneously rotatable in the same manner in the counter-clockwise direction. It will therefore be appreciated that the workpiece table is rotatable in the counter-clockwise direction only and the apparatus support is rotatable in both directions, either with or against the rotation of the workpiece table.

The robotic welding apparatus is preferably programmed to hunt in the clockwise direction for a workpiece to be welded. Therefore, using the inventive system with four workpiece positions, an operator loads and unloads workpieces on and from the workpiece table at one workplace position, referred to as indexed station A and, having loaded a workpiece, the table is caused to index 90° in the counter-clockwise direction until the said workpiece occupies station B, whereby the operator can repeat the unloading/loading operation at the next workplace position at station A. At station B, meanwhile, the welding apparatus, preferably controlled by a programmable logic controller (PLC), begins the computer-controlled welding operation on the workpiece. If the welding operation is completed by the time the operator next causes the table to index through a further 90°, the welding apparatus remains at station B to await the next workpiece to be welded while the first proceeds to station C. If, however, the said next indexed movement takes place before the welding operation is completed, the welding apparatus is indexed in synchronism with the workpiece table so that the welding operation can continue during the indexed movement and during the time spent at station C. Indeed, the welding operation can if necessary continue during indexed movement to and time spent at the fourth station, namely D. The welding operation having been completed, the welding apparatus then moves clockwise, against the rotation of the workpiece table, to the next (or next occupied) workpiece position.

It can thus be understood how, using the inventive system, production delays can be minimized, in that the welding apparatus may continue in operation during a temporary delay in loading and unloading of workpieces and in that loading/unloading may continue despite a welding operation not having been completed.

The workpiece positions at the workpiece table are preferably apertures over which a pallet holding the workpiece may be placed. The apparatus support preferably has the robot centrally mounted about the rotational axis of the table and support, the robot including the torch head and wire feeder and a torch cleaner being also mounted thereon, and the weld set including the power supply unit, wire container and water cooler being mounted beneath the support, and spaced laterally from the rotational axis. Opposite the weld set, the apparatus support may be provided with pallet-raising/-lowering means, for example pneumatic rams, to engage from beneath a pallet placed over a workpiece position aperture and to raise it clear of the workpiece table with positional precision. The workpiece is thus maintained in the same positional relationship to the welding apparatus irrespective of whether the table and apparatus support are in indexed movement or are stationary, and the pallet may be lowered to the workpiece table at the completion of the welding operation and the rams retracted to permit relative rotational movement between the workpiece table and the apparatus support.

Each pallet preferably contains a code, such as, for example, a binary code, a bar code or a radio-transmitted code, to enable the welding apparatus to identify the nature of the workpiece and to carry out the programmed welding operation thereon.

According to another aspect of the invention, a method of handling and performing work on a workpiece comprises supplying a workpiece to an indexed station in a first direction on a rotatable workpiece table, performing a working operation thereon by means of work-performing apparatus mounted for rotation about the same axis as the workpiece table, continuing if necessary to perform the working operation during indexed rotation of the workpiece table and work-performing apparatus in the said first direction to the next or a subsequent station, and at the completion of the working operation causing the workpiece table and work-performing apparatus to move relative to one another in a second direction in readiness for the next working operation.

Embodiments of the invention will now be described by way of example with reference to the accompanying drawing, which is a diagrammatic plan view of an apparatus for carrying out computer-controlled robotic welding operations.

As shown in the drawing, the apparatus consists of a workpiece table 11 and a support 12 for welding apparatus (not shown). The table has four workpiece positions 13–16, each having or being constituted by an aperture defined by the structure of the table. The support 12 consists of a rectangular plate; the support and table are coaxially mounted for rotation such that both can simultaneously move counter-clockwise and the support can move clockwise in relation to the table (that is, either the support can move counter-clockwise with the table stationary or moving clockwise, or the table can move counter-clockwise with the support remaining stationary). One end of the support is provided with pneumatic rams 17 for engaging the undersurface of a pallet, preferably via tapered or conical inverted cups to assist in precise location, and for lifting the pallet clear of the table, and the other end of the support has the welding set secured to the underneath, to avoid its interfering with relative movement between the table and the support.

The indexed stations are indicated A, B, C and D. Reference is made to foregoing parts of this specification for an explanation of the production sequence as between loading/unloading of workpieces at station A and the welding operation at stations B, C and/or D.

I claim:

1. Workpiece handling apparatus comprising a workpiece table which is rotatable between indexed stations in one rotational direction and a coaxially-mounted support for work-performing apparatus which is rotatable in both rotational directions.

2. Apparatus according to claim 1, in which the workpiece table includes a plurality n of workpiece stations arranged equi-angularly about the rotation axis and the table is indexed for rotation in $(360/n)°$ increments or in multiples thereof.

3. Apparatus according to claim 2, in which n is 4.

4. Apparatus according to claim 1, in which the work-performing apparatus is computer-controlled and is programmed to hunt in one direction for a workpiece to be worked, the workpiece table being movable in the other direction and work being performable at or during movement between indexed stations.

5. Apparatus according to claim 1, in which workpiece positions of the workpiece table comprise apertures over which a workpiece pallet may be placed, the apparatus support including pallet raising and lowering means which are operative through the apertures to raise a pallet to maintain its positional relationship to the work-performing apparatus irrespective of whether the table and apparatus support are in indexed movement or are stationary, the pallet raising and lowering means being retractable below the workpiece table to permit relative rotational movement between the workpiece table and work-performing apparatus support.

6. Apparatus according to claim 1, in which the work-performing apparatus can identify the nature of the workpiece according to a code and can carry out a pre-determined working operation thereon according to the identity of the workpiece.

7. Apparatus according to claim 1, in which the work-performing apparatus comprises a computer-controllable welding robot.

8. Apparatus according to claim 7, in which the robot is centrally mounted about the rotational axis of the table and support, the robot including the torch head and wire feeder, the weld set including the power supply unit, wire container and water cooler being mounted beneath the support.

9. A method of handling and performing work on a workpiece, the method comprising supplying a workpiece to an indexed station in a first direction on a rotatable workpiece table, performing a working operation thereon by means of work-performing apparatus mounted for rotation about the same axis as the workpiece table, continuing if necessary to perform the working operation during indexed rotation of the workpiece table and work-performing apparatus in the said first direction to the next or a subsequent station, and at the completion of the working operation causing the workpiece table and work-performing apparatus to move relative to one another in a second direction in readiness for the next working operation.

* * * * *